United States Patent [19]
Henry et al.

[11] Patent Number: 6,009,510
[45] Date of Patent: Dec. 28, 1999

[54] METHOD AND APPARATUS FOR IMPROVED ALIGNED/MISALIGNED DATA LOAD FROM CACHE

[75] Inventors: G. Glenn Henry; Terry Parks, both of Austin, Tex.

[73] Assignee: IP First LLC, Fremont, Calif.

[21] Appl. No.: 09/020,269

[22] Filed: Feb. 6, 1998

[51] Int. Cl.[6] .................................................. G06F 9/24
[52] U.S. Cl. .............................................................. 712/204
[58] Field of Search ............................................. 712/204

[56] References Cited

U.S. PATENT DOCUMENTS

| | | | |
|---|---|---|---|
| 4,860,197 | 8/1989 | Langendorf et al. | 712/238 |
| 5,471,593 | 11/1995 | Branigin et al. | 712/235 |
| 5,513,330 | 4/1996 | Stiles | 712/204 |
| 5,655,097 | 8/1997 | Witt et al. | 712/204 |
| 5,823,259 | 11/1998 | Stiles | 712/238 |

*Primary Examiner*—David Y. Eng
*Attorney, Agent, or Firm*—Richard K. Huffman; James W. Huffman

[57] ABSTRACT

An apparatus and method for loading aligned/misaligned data from a cache within a microprocessor is provided. The apparatus contains a first ALU for generating a partial offset, alignment check logic for quickly estimating the alignment of the data, a second ALU for generating a linear address, and alignment confirmation logic for confirming the alignment of the data. Quick estimation of data alignment allows the load of data to proceed before full alignment calculations are completed. A mandatory slip during data alignment checking is eliminated.

43 Claims, 7 Drawing Sheets

TWO SEQUENTIAL 32-BYTE CACHE LINES

METHOD AND APPARATUS FOR IMPROVED ALIGNED/MISALIGNED DATA LOAD FROM CACHE

BACKGROUND OF THE INVENTION

1. Field of the Invention

This invention relates in general to the field of data retrieval in computers, and more specifically to an improved method and apparatus for loading aligned and misaligned data from a cache within a microprocessor.

2. Description of the Related Art

Within a processing system, a common operation that is performed during execution of a software program is the retrieval of data from memory. To overcome timing bottlenecks associated with retrieval of the data from memory, whose access time is comparably slow with respect to microprocessor speeds, typical microprocessors retain a copy of frequently accessed data in a cache. A cache is a memory structure fabricated to provide data to a processor much faster than conventional memory. Thus, when a data load instruction references a memory address of a data entity that is also present in the cache, the data is retrieved from the cache rather than from memory.

Although access to data contained in a cache is indeed much faster than memory, microprocessors do not access a specific memory address within a cache. Rather, data is retrieved from the cache in defined subdivisions of the cache, called cache sub-lines. If the data is stored entirely within a single cache sub-line (i.e., the data is aligned), then it may be retrieved in an single load operation. If, however, a first part of the data is located in a first cache sub-line and a remaining part of the data is located in a second cache sub-line (i.e., the data is misaligned), then two sequential loads must be executed to retrieve the data.

Thus, whether or not a microprocessor retrieves data from a cache in one or two load operations depends on whether the data is in the cache, and whether the data is aligned or misaligned. Therefore, before a data load from a cache is initiated, a calculation must first be made to determine whether the desired data is aligned or misaligned, that is, whether one or two load operations will be required to load the desired data.

To determine whether data is aligned, the memory address of the data and its associated length must be known. Within an x86-compatible microprocessor, calculation of a memory address often requires that a 3-way addition be performed, the 3-way add summing a base, a displacement, and a segment base, for example. This 3-way addition is time consuming, and therefore cannot be completed in sufficient time to allow a second load instruction to be generated, if the data is misaligned. Hence, microprocessors typically insert a mandatory "slip" in a load operation to allow the alignment determination to complete, before allowing the load operation to continue. If the data requested by a load is aligned, then two cycles are needed: one for the mandatory slip and one for the load. If the data is misaligned, then three cycles are needed: one for the mandatory slip, and one for each of the two partial load operations. In addition, the slip is required for a "tickle" to insure that the second access is not going to cause a protection fault or a page fault. More specifically, the first half of the access cannot be permitted to finish before it is known whether the second access will create a page or protection fault.

Since load operations are ubiquitous in software programs, the time delays incurred in executing the load operations, as described above, can extensively affect the time required to execute the program.

Therefore, what is needed is an apparatus and method that allows a load of a data entity from cache to be executed faster than has heretofore been provided. In addition, what is needed is a microprocessor that executes a load of a data entity from cache without requiring insertion of a mandatory pipeline slip.

SUMMARY

To address the above-detailed deficiencies, it is an object of the present invention to provide a microprocessor that executes a load of a data entity from a cache which is faster than has heretofore been provided.

Another object of the present invention is to provide a microprocessor that executes a load of a data entity from cache without requiring insertion of a mandatory pipeline slip.

Accordingly, in the attainment of the aforementioned objects, it is a feature of the present invention to provide a microprocessor for executing a load of a data entity from a cache. The microprocessor includes a first ALU, coupled to alignment check logic, and a second ALU, coupled to alignment confirmation logic. The first ALU is also coupled to register buffers and generates a partial offset early in a pipeline cycle. The alignment check logic uses the partial offset and a load length to estimate alignment of the data entity, thereby allowing the load to be performed without insertion of a pipeline slip. The second ALU is also coupled to the register buffers and generates a linear address later in the pipeline cycle. The alignment confirmation logic uses the linear address and the load length to confirm alignment of the data entity. Should misalignment of the data entity be determined late in the pipeline cycle, then the alignment confirmation logic generates an exception signal.

An advantage of the present invention is that execution of a load of an aligned data entity from a cache is performed without a pipeline slip.

In another aspect, it is a feature of the present invention to provide a microprocessor for executing a load of a data entity from a data cache that includes an address sequencer, coupled to a load sequencer. The address sequencer is coupled to register buffers and generates an index estimate early in a pipeline cycle. The load sequencer uses the index estimate and a load length to estimate alignment of the data entity, thereby allowing the load to be performed without insertion of a pipeline slip. The address sequencer also generates a true index later in the pipeline cycle. The load sequencer uses the true index and the load length to confirm alignment of the data entity. Should misalignment of the data entity be determined late in the pipeline cycle, then the load sequencer generates an exception signal.

In yet another aspect, it is a feature of the present invention to provide a method for loading a data entity from a cache that initially estimates alignment of a data entity, to allow load operations to proceed without a pipeline slip, and later confirms the alignment of the data entity.

Another advantage of the present invention is that execution of a load of a misaligned data entity from a cache is performed in two or less pipeline cycles.

BRIEF DESCRIPTION OF THE DRAWINGS

These and other objects, features, and advantages of the present invention will become better understood with regard to the following description, and accompanying drawings where.

DETAILED DESCRIPTION

Figure 1:
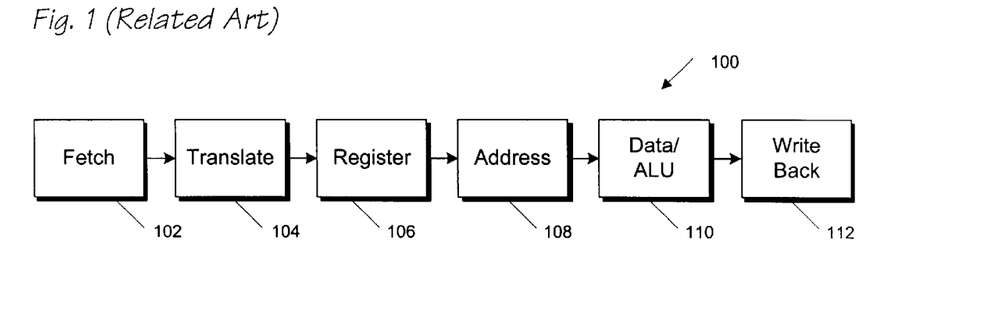
FIG. 1 is a block diagram of a related art pipeline microprocessor.

Referring to FIG. 1, a six-stage related art pipeline microprocessor 100 is shown. The microprocessor 100 includes: fetch 102, translate 104, register 106, address 108, data/ALU 110 and write back 112 stages. The fetch stage 102 fetches instructions that are to be executed by the microprocessor 100. The translate stage 104 translates or decodes the fetched instructions into a sequence of processor instructions that may be executed by the microprocessor 100. The register stage 106 retrieves operands specified by the processor instructions from a register file, for use by later stages in the pipeline. The address stage 108 calculates memory addresses specified by processor instructions, to be used in data retrieval and storage operations. The data/ALU stage 110 either performs arithmetic logic unit (ALU) operations on data retrieved from the register file, or reads/writes data from/to memory using the memory addresses calculated in the address stage 108. The write back stage 112 writes the result of a data read operation, or an ALU operation, to the register file, or to a memory location.

In operation, instructions are fetched by the fetch stage 102, are translated into processor instructions by the translate stage 104, and proceed through stages 106–112 for execution.

During a cycle of the pipeline, while any given stage in the pipeline is executing an instruction, the previous stage should be executing the next instruction. If execution of an instruction within one stage requires more than one cycle to complete, then subsequent instructions are "stalled" until execution of that instruction is completed. When this occurs, "pipeline slips" are inserted into the pipeline to insure that the subsequent instructions do not prematurely advance in the pipeline.

One example of when a pipeline slip is required occurs when reading and writing data from memory. Due to the slow access time of conventional memory, as compared to the speed of the processor, a read from or a write to memory typically requires many pipeline cycles to complete. Thus, when the data/ALU stage 110 performs a read (i.e., a "load") from memory, pipeline slips are inserted into the pipeline until the load operation completes.

To circumvent pipeline slips associated with loading data from memory, conventional microprocessors retain a copy of frequently used blocks of memory in a cache. A cache is a memory structure fabricated to provide data to a processor much faster than conventional memory. Thus, when a data load instruction references a memory address of a data entity that is also present in a cache, the data entity is loaded from the cache rather than from memory. This results in fewer pipeline slips during data retrieval.

Figure 2:
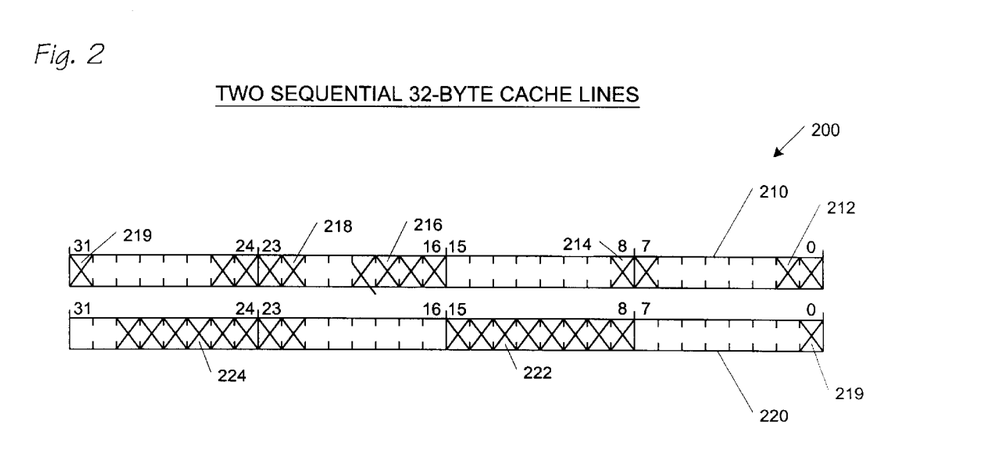
FIG. 2 is a portion of a data cache within a microprocessor illustrating data entities of varying lengths that are aligned and misaligned.

Now referring to FIG. 2, a subset of a data cache 200 is provided that illustrates two sequential 32-byte cache lines 210, 220. For both cache line 210 and 220, a data entity may be stored in any of the 32 byte locations, with the constraint that the data entity's constituent bytes are stored in adjacent byte locations within the cache 200. Byte 31 of line 210 is considered to be adjacent to byte 0 of line 220.

Although lines 210 and 220 each have a byte length of 32, they are accessed (e.g., loaded, retrieved, or stored) by read/write logic in a microprocessor in subdivisions of the 32-byte cache line, called cache sub-lines. Although different caches have different cache sub-line sizes, the following discussion is directed to a cache with 8-byte cache sub-lines.

Typically, access to a cache sub-line requires one pipeline cycle, if the data being requested resides entirely within a single cache sub-line. If data crosses a cache sub-line boundary, then more than one cycle is required. Several cases of data entity storage and retrieval from the data cache 200 will now be discussed to better illustrate this point.

A word 212 having a length of two-bytes is shown within line 210. It is stored in byte positions 0 and 1 of line 210. It is considered aligned within line 210 because it is completely stored within a single cache sub-line comprising bytes 0 through 7. Because it is aligned, it may be retrieved in one cycle.

A second word 214 is shown within the line 210. It is stored in byte positions 7 and 8. It is considered misaligned within line 210 because a first byte of the word 214 is stored within a cache sub-line comprising bytes 0 through 7 and a remaining second byte is stored within a following cache sub-line comprising bytes 8 through 15. Because the word is misaligned, it may not be loaded in a single cycle.

A doubleword 216, having a length of four bytes, is stored in bytes 16 through 19 of line 210. It is considered aligned because it is completely stored within a cache sub-line comprising bytes 16 through 23 of line 210. Because it is aligned, it may be loaded in one cycle.

A second doubleword 218 occupies bytes 22 through 25 of line 210. Loading of the doubleword 218 requires more than one cycle because it crosses a cache sub-line boundary marked by bytes 23 and 24 of line 210.

A word 219 occupies byte 31 of line 210 and byte 0 of line 220. Because it is not completely stored within a single cache sub-line, it is considered misaligned. Loading of this data entity requires more than one cycle.

A quadword 222, having a length of eight bytes, occupies byte positions 8 through 15 of line 220. Because it is aligned, that is because it is stored entirely within a single cache sub-line, it may be loaded in one cycle.

A second quadword 224 occupies bytes 22 through 29 of line 220. Loading of quadword 224 requires more than one pipeline cycle because it crosses a cache sub-line boundary marked by bytes 23 and 24 of line 220.

With the above background on aligned/misaligned data entities within a cache, a problem associated with loading data, that is, aligned or misaligned data in a cache, will now be discussed with reference to FIG. 3.

Figure 3:
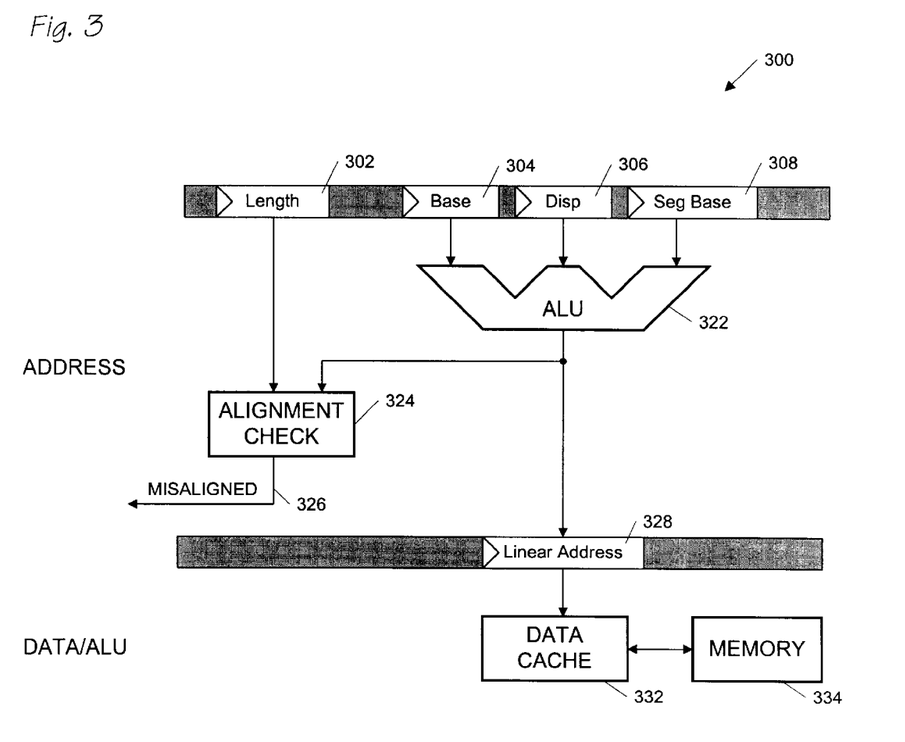
FIG. 3 is a block diagram of address and data/ALU stages of a pipeline microprocessor.

In FIG. 3, a block diagram of a portion of a pipeline microprocessor 300 is shown. The portion includes an address stage and a data/ALU stage. The address stage has an arithmetic-logic unit (ALU) 322 connected to alignment check logic 324. The output of the ALU 322 is connected to the data/ALU stage via a linear address register 328. The data/ALU stage contains a data cache 332 connected to the linear address register 328. In addition, the data cache 332 is connected to a memory 334.

Operationally, the ALU 322 receives address information related to data that is to be stored to, or loaded from a memory location within the memory 334, and calculates the linear address for that memory location. The address information is specified by a processor instruction and is provided to the ALU 322 via a base address register 304, a displacement register 306, and a segment base address register 308. Other registers associated with calculating a memory address in segmented memory may be needed, but have not been shown to ease illustration. The ALU 322 adds the contents of each of the registers 304, 306, and 308 to determine the linear address, which is provided to the data/ALU stage via the linear address register 328. If the operation results in a cache hit, that is, if the contents of the specified memory location are contained within the data cache 332, then the data entity specified by the instruction is stored/retrieved from the data cache 332 rather than from the memory 334.

The linear address denotes the location of the first byte of the specified data entity. Whether the specified data entity is aligned or misaligned is determined by knowing a byte length of the data entity, which is also specified by the processor instruction, in addition to the location of its first byte. Thus, to determine whether the data entity is aligned or misaligned, the linear address is provided to the alignment check logic 324.

In addition to the linear address, the byte length of the data entity is provided to the alignment check logic 324 by a length register 302. If the data entity is misaligned, then the alignment check logic 324 generates a misaligned signal 326. If the misaligned signal 326 is asserted, then control logic within the microprocessor will cause two loads, rather than one load, to retrieve the data entity.

To schedule a misaligned load sequence in the data/ALU stage, one skilled in the art will recognize that the linear address must be determined early in the address stage pipeline cycle. However, because of ALU technology limitations, it is not possible to complete the 3-way sum early in the address stage pipeline cycle. Hence, when a processor instruction specifies a load operation, microprocessors typically insert a mandatory pipeline slip into the address stage to allow the ALU 322 time to calculate the linear address, and to allow the alignment check logic 324 time to determine whether the data entity is aligned or misaligned.

Although misalignment may result as a function of the contents of the length register 302, the base address register 304, the displacement register 306, and the segment base address register 308, alone or in combination, research indicates that the contents of the segment base address register 308 normally do not affect the alignment of a data entity. For example, a base address of 10, a displacement of two, and a length of four will normally result in a data entity being considered aligned within a cache comprised of 8-byte cache sub-lines, like that shown in FIG. 2. However, if low order bits of the segment base address equate to one, two, three, or four, then the data entity is actually misaligned because of a misaligned segment base address. A segment base address is considered to be misaligned if it is not a multiple of the cache sub-line size. If a segment base address is not misaligned, that is, if it is a multiple of the cache sub-line size, then it will not affect the alignment of the data entity.

Figure 4:
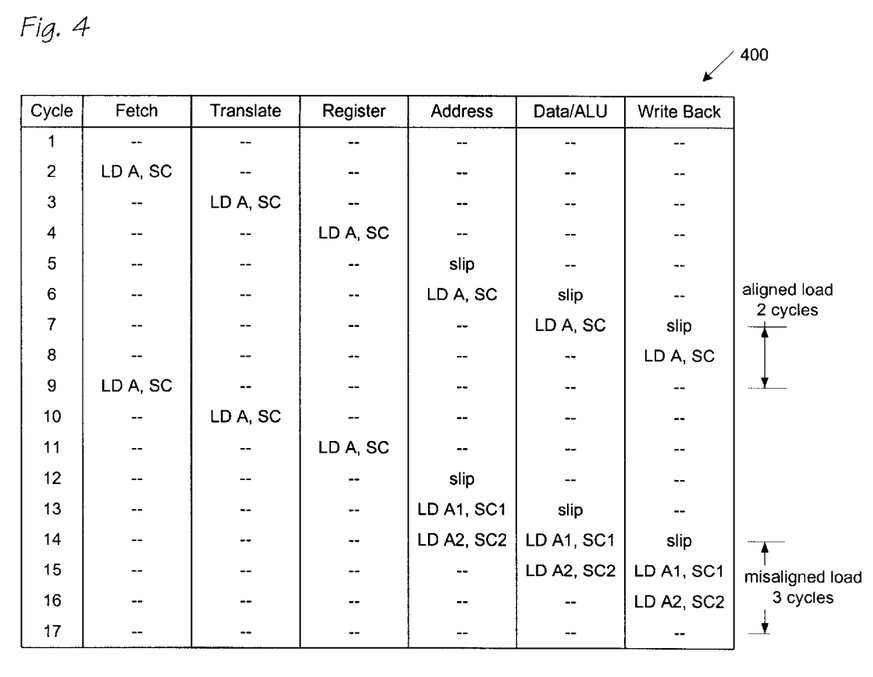
FIG. 4 is a table illustrating execution of a load instruction for aligned data followed by a load instruction for misaligned data by the microprocessor of FIG. 3.

Now referring to FIG. 4, a table 400 is provided, illustrating execution of a load instruction for aligned data followed by a load instruction for misaligned data, by the microprocessor 300 of FIG. 3. A load instruction is designated as LD A,SC. The A designates a destination of the data entity for the load instruction and SC designates its source address. More specifically, A designates a register in a register file into which will be stored a data entity retrieved from a source address SC in the memory 334. The marks "–" designate instructions before and after the instructions of interest. Progression of the load instruction through each stage of the pipeline is shown with respect to cycles of a pipeline clock.

During cycle 2, the load instruction, LD A,SC, is fetched from memory and provided to the translate stage.

During cycle 3, the load instruction proceeds through the translate stage of the microprocessor 300. The translate stage decodes the load instruction into a processor instruction or sequence of processor instructions for execution by following stages in the pipeline of the microprocessor 300. Also, during cycle 3, the next instruction is fetched by the fetch stage of the processor. Progression of the next instruction follows one cycle behind the load instruction.

During cycle 4, the load instruction proceeds through the register stage of the microprocessor 300. Since the instruction being executed is a load instruction, no data are retrieved from the register file within the register stage. However, as will be illustrated below, the register file may provide address information necessary to calculate the memory address specified by SC.

During cycle 5, the load instruction proceeds through the address stage of the microprocessor 300. At this point, the address stage inserts a mandatory pipeline slip. Referring back to FIG. 3, the ALU 322 calculates the linear address, which is the memory address specified by SC. For the LD A,SC instruction, the memory address specified by SC is calculated by summing the contents of the base address register 304, the displacement register 306, and the segment base address register 308. These quantities are specified either explicitly or implicitly by the LD A,SC instruction, and are stored into the base address register 304, the displacement register 306, and the segment base address register 308 during cycle 4. So, during cycle 5, the ALU 322 sums these three quantities to determine the memory address specified by SC. This address is stored into the linear address register 328.

As alluded to previously, if the load instruction specifies a load of a data entity that is misaligned, and the data entity is in the data cache 322, then the load cannot be performed in a single pipeline cycle. Rather, two sequential loads are performed to retrieve the specified data. However, due to the complexity of the 3-way add performed by the ALU 322, it is not known whether the data specified by the LD A,SC instruction is aligned or misaligned until late in the cycle. Therefore, the microprocessor 300 issues a mandatory pipeline slip to allow the ALU 322 and the alignment check logic 324 time to determine whether the data being loaded is aligned/misaligned, and thus whether one or two load operations are required to load the specified data.

One skilled in the art will appreciate that the slip causes the LD A,SC instruction to stall within the address stage for an additional cycle.

During cycle 6, the slip proceeds through the data/ALU stage of the microprocessor 300 and execution of the load instruction completes in the address stage. At this point, the alignment check logic 324 has received the linear address from the ALU 322 and the length of the data being loaded from the length register 302, and has determined that the data being loaded is aligned. Therefore, only one load instruction is required to retrieve the specified data. This load instruction proceeds to the data/ALU stage.

During cycle 7, the slip proceeds through the write back stage of the microprocessor 300. Also, during cycle 7, the load instruction proceeds through the data/ALU stage. Because the data entity is aligned, the specified data entity is retrieved. If a copy of the data entity resides within the data cache 332, then the data entity is retrieved from the data cache 332. Otherwise, the data entity is retrieved from the memory 334.

During cycle 8, the load instruction proceeds through the write back stage. In this stage, the data entity that has been retrieved is written into the destination register A. At this point, execution of the LD A,SC instruction is completed.

As FIG. 4 illustrates, progression of the load instruction for the data entity through the pipeline required two pipeline cycles, even though the data entity was aligned. This is because it was not known until late in the address stage of cycle 5 whether the data entity being retrieved was aligned or misaligned.

Now continuing with FIG. 4, progression of a load instruction that specifies misaligned data will be shown through the microprocessor 300 of FIG. 3.

During cycle 9, a load instruction associated with a misaligned data entity is fetched by the fetch stage of the microprocessor 300.

During cycle 10, the load instruction proceeds through the translate stage of the microprocessor 300 and is decoded.

During cycle 11, the load instruction proceeds through the register stage wherein a base address and a segment base address specified by the load instruction are retrieved.

During cycle 12, the load instruction proceeds through the address stage. At this point, the address stage inserts a pipeline slip as before, to provide for the calculation of the linear address, and for determination by the alignment check logic 324 as to whether the data entity being retrieved is aligned or misaligned. In this case, the alignment check logic 324 determines that the data entity is misaligned, and generates the misaligned signal 326.

During cycle 13, the pipeline slip proceeds through the data/ALU stage. Also during cycle 13, control logic within the microprocessor causes a first load instruction, LD A1,SC1, to be provided by the address stage. A1 designates the destination of a first part of the data entity and SC1 designates a memory location wherein the first part of the data entity is located. If a copy of the first part of the data entity is in the data cache 332, then it will be located in a first cache sub-line.

During cycle 14, the pipeline slip proceeds through the write back stage. Also during cycle 14, the first load instruction proceeds through the data/ALU stage, wherein the first part of the data entity is loaded from the first cache sub-line, if a copy of the first part of the data entity is in the data cache 332. In addition, a second load instruction, LD A2,SC2, is provided by the address stage. A2 designates the destination for a remaining part of the data entity and SC2 designates a second memory location wherein the remaining part of the data entity is located. If a copy of the remaining part of the data entity is in the data cache 332, then it will be located in a second cache sub-line.

During cycle 15, the first load instruction proceeds through the write back stage and completes execution. Also during cycle 15, the second load instruction proceeds through the data/ALU stage wherein the remaining part of the data entity is retrieved from the second cache sub-line.

During cycle 16, the second load instruction proceeds through the write back stage and completes execution.

As FIG. 4 illustrates, progression of the load instruction for the misaligned data entity through the pipeline requires three pipeline cycles. Two cycles were required for retrieval of the misaligned data entity, and one cycle for the pipeline slip that was inserted during the address stage of cycle 12.

In summary, whether the data entity is aligned or misaligned within the data cache 332, a mandatory pipeline slip is inserted during the address stage to provide for calculation of the 3-way sum, and to determine the alignment of the data entity. It is this problem that is addressed by the present invention, as will now be described below.

The present invention exploits the fact that a segment base address is typically aligned, and therefore does not affect the alignment of a data entity, except in rare instances.

Figure 5:
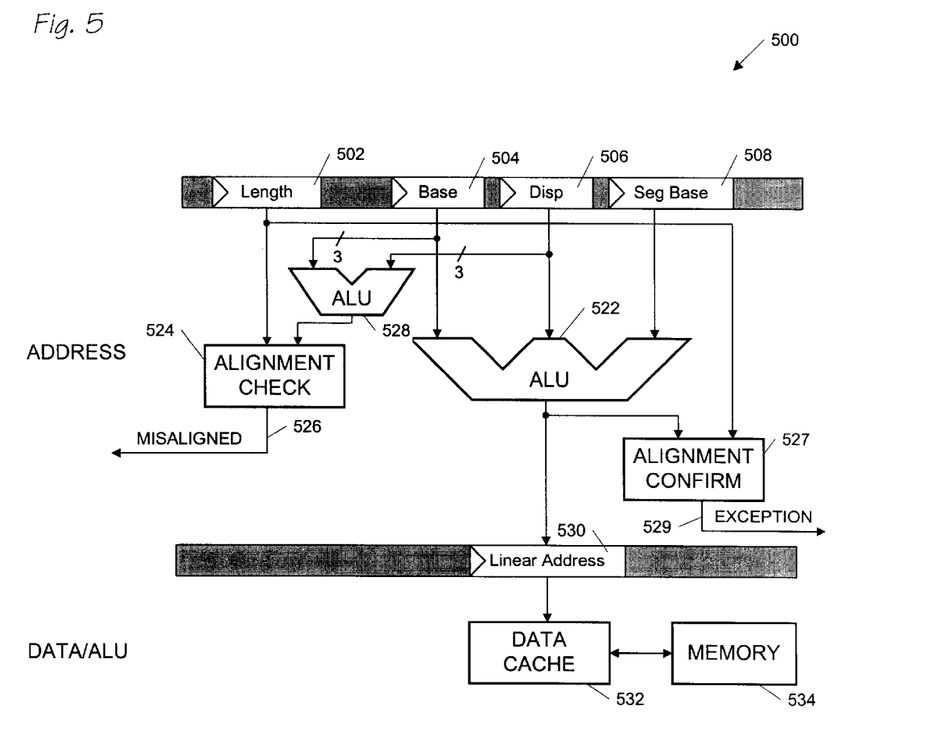
FIG. 5 is a block diagram of address and data/ALU stages of a pipeline microprocessor incorporating an embodiment of the present invention.

Now referring to FIG. 5, a block diagram of a portion of a pipeline microprocessor 500 incorporating an embodiment of the present invention is provided. The portion includes an address stage and a data/ALU stage. The address stage has a 2-way ALU 528 whose output is provided to alignment check logic 524. In addition, the address stage has a 3-way ALU 522 connected to alignment confirmation logic 527. The output of the 3-way ALU 522 is also connected to the data/ALU stage via a linear address register 530. The data/ALU stage contains a data cache 532 connected to the linear address register 530. In addition, the data cache 532 is connected to a memory 534.

Operationally, the 3-way ALU 522 receives address information related to data that is to be stored to, or loaded from a memory location within the memory 534, and calculates the linear address for that memory location. Like the microprocessor 300 shown in FIG. 3, the address information is specified by a processor instruction and is provided to the 3-way ALU 522 via a base address register 504, a displacement register 506, and a segment base address register 508. The 3-way ALU 522 adds the contents of each of the registers 504, 506, and 508 to determine the linear address, which is then provided to the data/ALU stage via the linear address register 530. If the operation results in a cache hit, then the data entity specified by the instruction is stored/retrieved from the data cache 532 rather than from the memory 534.

The present invention, moreover, sums low order bits of the base address register 504 and the displacement register 506 in the 2-way ALU 528 to form a partial offset early in the pipeline cycle. This partial offset, a 3-bit sum, is provided to the alignment check logic 526. In conjunction with a length of the data entity, provided by a length register 502, the alignment check logic 526 uses the partial offset to estimate the alignment of the data entity. By using the partial offset, an estimated index of the data entity within the memory 534, the alignment check logic 526 estimates whether the specified data entity is aligned or misaligned. If the data entity is estimated to be misaligned, then the alignment check logic 524 generates a misaligned signal 526. If the misaligned signal 526 is asserted, then control logic within the microprocessor 500 will cause two loads, rather than one load, to be generated to retrieve the data entity.

Since the 2-way add is a relatively simple calculation, it may easily be performed early in the pipeline cycle. One skilled in the art will recognize that insertion of a mandatory pipeline slip is therefore not required. Rather, the load sequence may be scheduled based upon an estimate of the alignment of the data entity.

To account for the rare instances where a misaligned segment base address affects the alignment of a data entity, the linear address is also provided to alignment confirmation logic 527. In conjunction with the length of the data entity, provided by the length register 502, the alignment confirmation logic 527 uses the linear address to confirm the alignment of the data entity. By using the linear address as a true index of the data entity within the memory 534, the alignment confirmation logic 527 confirms whether the data entity is aligned or misaligned. Because the linear address is not available until late in the pipeline cycle, if the alignment confirmation logic 527 confirms that the data entity is indeed misaligned, and that the misalignment results from a misaligned segment base, an exception signal 529 is generated. In the specific case of a processor comprising 8-byte cache sub-lines, only a segment base address which is not a multiple of eight would be considered as a misaligned segment base address, and would thus affect the alignment of the data entity.

Figure 6:
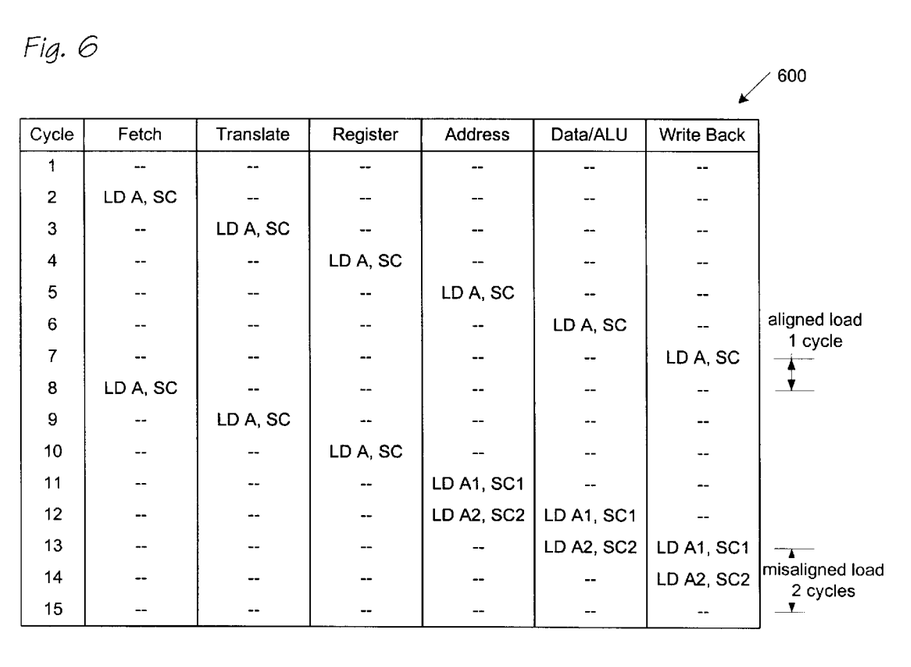
FIG. 6 is a table illustrating execution of a load instruction for aligned data followed by a load instruction for misaligned data by the microprocessor of FIG. 5.

Now referring to FIG. 6, a table 600 is provided, illustrating execution of a load instruction for aligned data followed by a load instruction for misaligned data, by the microprocessor 500 of FIG. 5. A load instruction is designated as LD A,SC. The A designates the destination of the data entity for the load instruction and SC designates its source address. More specifically, A designates a register in a register file into which will be stored a data entity retrieved from a source address SC in the memory 534. The marks "--" designate instructions before and after the instructions of interest. Progression of the load instruction through each stage of the pipeline is shown with respect to cycles of a pipeline clock.

During cycle 2, the load instruction is fetched by the fetch stage of the microprocessor 500.

During cycle 3, the load instruction proceeds through the translate stage of the microprocessor 500 and is decoded. Also, during cycle 3, the next instruction proceeds through the fetch stage of the pipeline. Progression of the next instruction follows one cycle behind the load instruction.

During cycle 4, the load instruction proceeds through the register stage of the microprocessor 500 wherein a base address and a segment base address specified by the load instruction are retrieved.

During cycle 5, the load instruction proceeds through the address stage of the microprocessor 500. Referring back to FIG. 5, the 2-way ALU 328 calculates a partial offset. For the LD A,SC instruction, the partial offset for SC is calculated by summing the three low order bits of the contents of the base address register 504 and displacement register 506. These quantities are stored in the base address register 504 and the displacement register 506 during cycle 4. So, during cycle 5, the 2-way ALU sums these two quantities and provides them to the alignment check logic 524. The alignment check logic 524 estimates the alignment of the data entity specified by SC. If the load instruction specifies a data entity that is estimated to be misaligned, then two sequential loads are performed to retrieve the specified data.

Because the partial offset is used to estimate the alignment of the data entity specified by the LD A,SC instruction, one skilled in the art will appreciate that it is not necessary to stall the pipeline as was the case for the load instructions executed by the microprocessor 300 of FIG. 3. In cycle 5, the alignment check logic 524 has received the partial offset from the 2-way ALU 528 and the length of the data being loaded from the length register 502, and has estimated that the data being loaded is aligned. Moreover, late in cycle 5, the alignment confirmation logic 527 has received the linear address from the 3-way ALU 522 and the length of the data being loaded from the length register 502, and has confirmed that the data being loaded is aligned. Therefore, only one load instruction is required to retrieve the specified data. This load instruction proceeds to the data/ALU stage.

During cycle 6, the load instruction proceeds through the data/ALU stage of the microprocessor 500. Because the data entity is aligned, the specified data is retrieved. If a copy of the data entity resides within the data cache 532, then the data entity is retrieved from the data cache 532. Otherwise, the data entity is retrieved from the memory 534.

During cycle 7, the load instruction proceeds through the write back stage. In this stage, the data entity that has been retrieved is written into the destination register A. At this point, execution of the LD A,SC instruction is completed.

As FIG. 6 illustrates, progression of the load instruction for the data entity through the pipeline required only one pipeline cycle. This is because the alignment of the data entity, in accordance with the present invention, was estimated early in the address stage of cycle 5.

Now continuing with FIG. 6, progression of a load instruction that specifies misaligned data will be shown through the microprocessor 500 of FIG. 5.

During cycle 8, a load instruction associated with a misaligned data entity is fetched by the fetch stage of the microprocessor 500.

During cycle 9, the load instruction proceeds through the translate stage of the microprocessor 500 and is decoded.

During cycle 10, the load instruction proceeds through the register stage of the microprocessor 500 wherein a base address and a segment base address specified by the load instruction are retrieved.

During cycle 11, the load instruction proceeds through the address stage of the microprocessor 500. Following calculation of the partial offset by the 2-way ALU 528, the alignment check logic 524 estimates that the data entity within the data cache 532 is misaligned and generates the misaligned signal 526. Because misalignment of the data entity was estimated early in the pipeline cycle, control logic within the microprocessor causes a first load instruction, LD A1,SC1, to be provided by the address stage. A1 designates the destination of a first part of the data entity and SC1 designates a memory location wherein the first part of the data entity is located. If a copy of the first part of the data entity is in the data cache 532, then it will be located in a first cache sub-line.

During cycle 12, the first load instruction proceeds through the data/ALU stage, wherein the first part of the data entity is loaded from the first cache sub-line, if a copy of the data entity is in the data cache 532. In addition, a second load instruction, LD A2,SC2, is provided by the address stage. A2 designates the destination for a remaining part of the data entity and SC2 designates a second memory location wherein the remaining part of the data entity is located. If a copy of the remaining part of the data entity is in the data cache 532, then it will be located in a second cache sub-line.

During cycle 13, the first load instruction proceeds through the write back stage and completes execution. Also during cycle 15, the second cache sub-line load instruction proceeds through the data/ALU stage where the remaining part of the data entity is retrieved from the second cache sub-line, if a copy of the data entity specified by LD A2,SC2 is in the data cache 532.

During cycle 14, the second load instruction proceeds through the write back stage and completes execution.

As FIG. 6 illustrates, progression of the load instruction for the misaligned data entity through the pipeline of the microprocessor 500 required two pipeline cycles for retrieval of the misaligned data entity. However, because the partial offset was used by the alignment check logic 524 to estimate the alignment of the data entity, the execution of the misaligned load was able to proceed without insertion of a mandatory pipeline slip, as was the case depicted in FIG. 4 for the microprocessor 300 of FIG. 3.

One skilled in the art will appreciate that the pipeline slip shown in FIG. 4 for alignment determination by the microprocessor 300 of FIG. 3, and hence the time associated with the pipeline slip, has been eliminated during execution of a load instruction by the microprocessor 500 of FIG. 5, which incorporates an embodiment of the present invention. The mandatory pipeline slip has therefore been eliminated, regardless of the alignment of the data entity specified by the load instruction.

Figure 7:
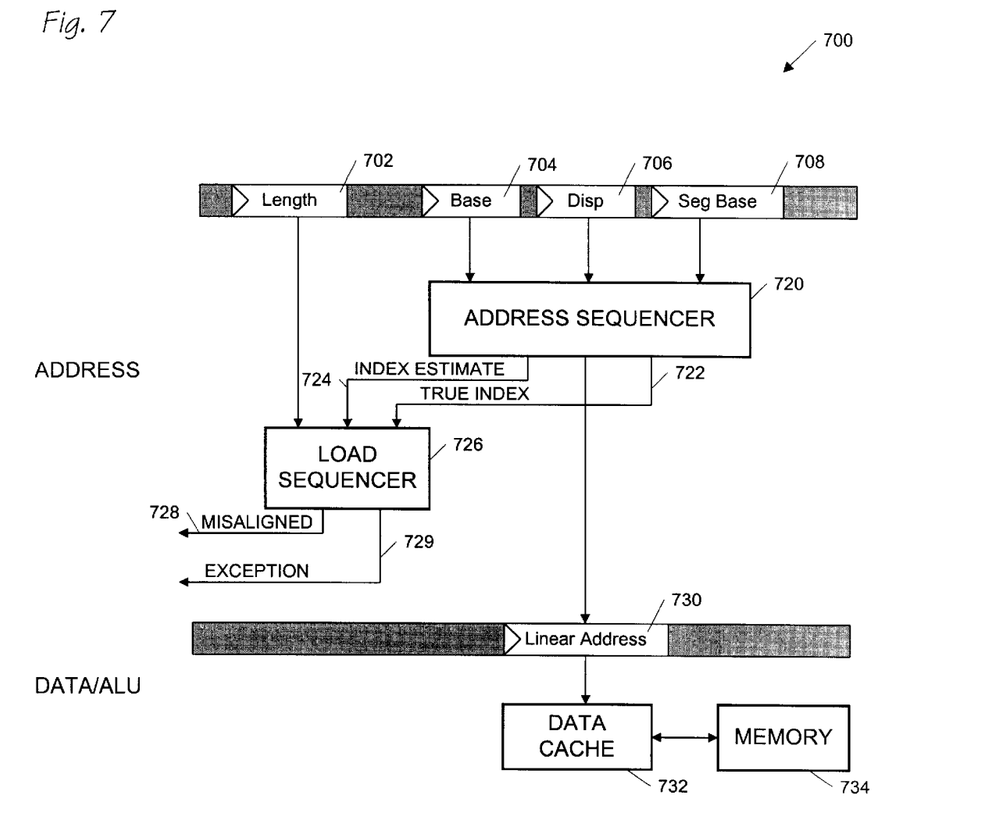
FIG. 7 is a block diagram of address and data/ALU stages of a pipeline microprocessor incorporating an alternative embodiment of the present invention.

Now referring to FIG. 7, a block diagram of a portion of a pipeline microprocessor 700 employing an alternative embodiment of the present invention is provided. Like elements are referenced with like numbers, the hundreds digit replaced with a 7. The portion includes an address stage and a data/ALU stage. The address stage has an address sequencer 720 connected to a load sequencer 726. One output of the address sequencer 720, a linear address, is provided to a linear address register 730. The data/ALU stage contains a data cache 732 connected to the linear address register 730. In addition, the data cache 732 is connected to a memory 734.

In operation, the address sequencer 720 receives address information related to data that is to be stored to, or loaded from a memory location within the memory 734, and calculates the linear address for that memory location. The address information is specified by a processor instruction and is provided to the address sequencer 720 via a base address register 704, a displacement register 706, and a segment base address register 708. The address sequencer 720 adds the contents of each of the registers 704, 706, and 708 to determine the linear address, which is then provided to the data/ALU stage via the linear address register 730. If the operation results in a cache hit, then the data entity specified by the instruction is retrieved from the data cache 732 rather than from the memory 734.

In this alternative embodiment of the present invention, the address sequencer 720 also sums the contents of the base address register 704 and the displacement register 706 early in the pipeline cycle. Low order bits of this sum are transmitted as an index estimate 724 to the load sequencer 726. In conjunction with length of the data entity, provided by a length register 702, the load sequencer 726 uses the index estimate 724 to estimate the alignment of the data entity. If the data entity is estimated to be misaligned, then the load sequencer 726 generates a misaligned signal 728. If the misaligned signal 728 is asserted, then control logic within the microprocessor will cause two loads, rather than one load to retrieve the data entity. Whether the data being retrieved is aligned or misaligned, a load instruction proceeds to the data/ALU stage without a pipeline slip.

Following calculation of the linear address by the address sequencer 720, a true index 724, comprising low order bits of the linear address, is provided to the load sequencer 726. In conjunction with the contents of the length register 702, the load sequencer 726 uses the true index to confirm the alignment of the data entity. If the load sequencer 726 confirms that the data entity is indeed misaligned, and that the misalignment results from a misaligned segment base, an exception signal 729 is generated.

Figure 8:
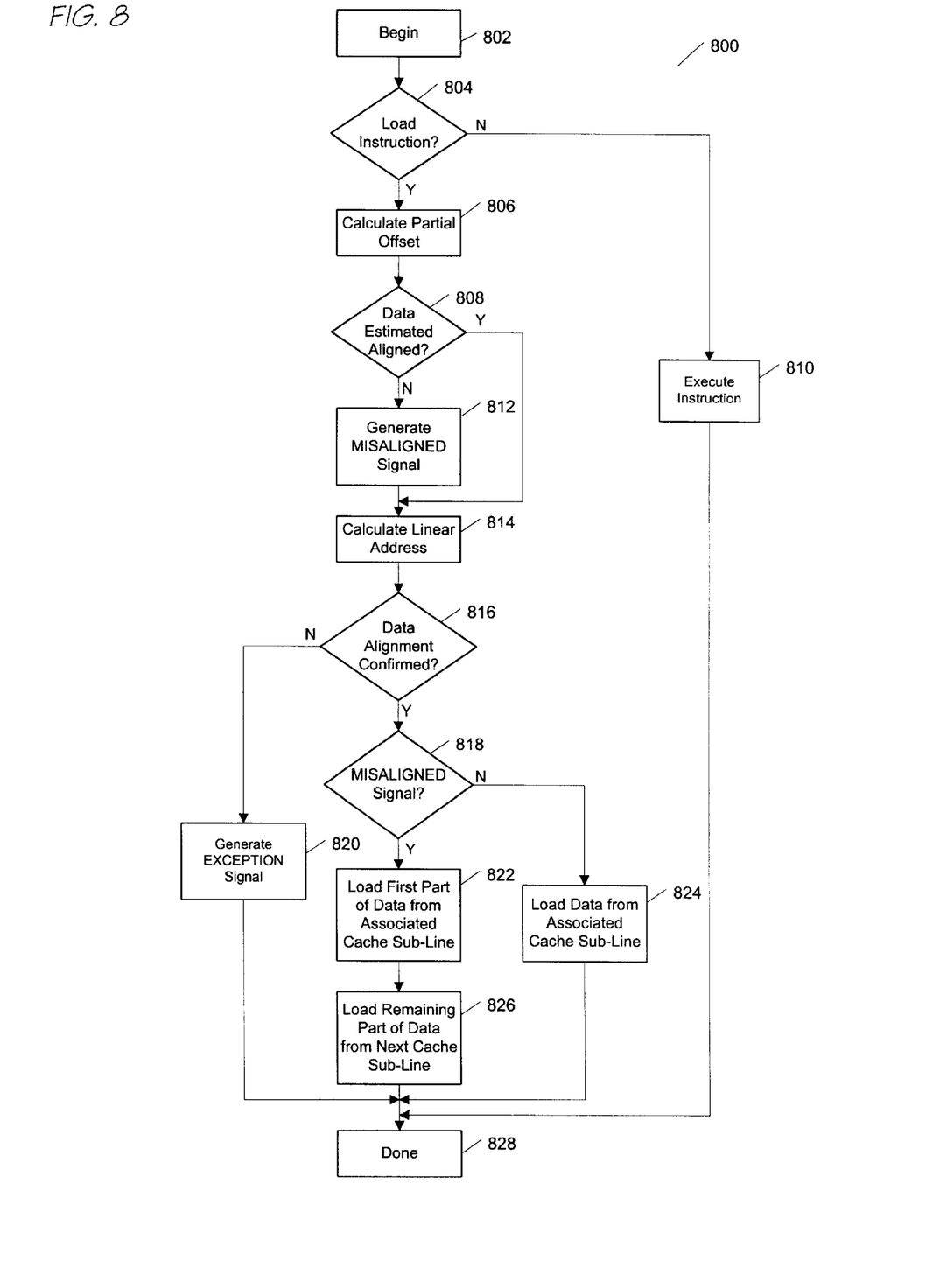
FIG. 8 is a flow chart illustrating the method according to the present invention for loading data from a cache.

Now referring to FIG. 8, flow chart 800 is presented that illustrates the flow of a load of a data entity from a cache according to the present invention.

The method begins at block 802 and proceeds to decision block 804.

At decision block 804, a determination is made whether a load instruction is being executed. If so, then flow proceeds to block 806. If not, then flow proceeds to block 810.

At block 810, the instruction is executed. Flow then proceeds to block 828 where the operation completes.

At block 806, a partial offset is generated that is used to estimate the alignment of a data entity referenced by the load instruction. Flow then proceeds to decision block 808.

At decision block 808, the alignment of the data entity is estimated. The estimate uses the partial offset calculated in block 806, and a data entity length. If the data entity is estimated to be aligned, then flow proceeds to block 814. If the data entity is estimated to be misaligned, then flow proceeds to block 812, where a misaligned signal is generated. Following generation of the misaligned signal in block 812, flow proceeds to block 814.

At block 814, a linear address is generated that is used to confirm the alignment of the data entity. Flow then proceeds to decision block 816.

At decision block 816, the alignment of the data entity is determined by using the linear address and the data entity length. If the data entity is confirmed to be misaligned, and the misalignment results from a misaligned segment base, then flow proceeds to block 820, where an exception signal is generated. Otherwise, flow proceeds to decision block 818.

At decision block 818, it is determined if a misaligned signal was generated at block 812. If not, flow proceeds to block 824.

At block 824, the data entity is loaded from a single associated cache sub-line, if the data entity is located within the associated cache sub-line. Otherwise, flow proceeds to block 822. Flow then proceeds to block 828 where the aligned data load operation completes.

At block 822, a first part of the data entity is loaded from an associated cache sub-line, if the first part of the data entity is located within the associated cache sub-line. Flow then proceeds to block 826.

At block 826, a remaining part of the data entity is loaded from a next cache sub-line, if the remaining part of the data entity is located within the next cache sub-line. Flow then proceeds to block 828 where the misaligned data load operation completes.

The flowchart 800 therefor illustrates how an alignment estimate may be used during a load operation to allow a load operation to advance, prior to a full alignment determination. When the alignment estimate is correct, significant processing gains are achieved. And, since misaligned loads are so seldom base on misaligned segment bases, the exception mechanism is not considered detrimental.

Although the present invention and its objects, features, and advantages have been described in detail, other embodiments are encompassed by the invention. For example, the present invention has been described by alternative embodiments that allow a data entity to be loaded from a cache, regardless of the alignment of the data entity within the cache, without inserting a pipeline slip. By not inserting the pipeline slip, execution performance of a load operation is improved. In future microprocessors, it may be advantageous to load a data entity from memory in a manner similar to that used for loading data from a cache. This invention anticipates such improvements.

The present invention has been particularly described with reference to load operations from a cache. However, it is within the scope of the present invention to load data from any type of memory wherein alignment of data is a time critical issue. Furthermore, the invention has been described with reference to load operations. One skilled in the art will appreciate that the invention is also applicable to store operations.

Moreover, the present invention has been particularly described with reference to a cache within a microprocessor. However, it is also within the scope of the present invention to provide a method for loading data from a cache, without regard for whether the cache is physically located within the microprocessor.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor for executing a load of a data entity from a cache, comprising:
    a first ALU, coupled to register buffers, for generating a partial offset during the load;
    alignment check logic, coupled to said first ALU, configured to receive a load length and said partial offset, for estimating alignment of the data entity;
    a second ALU, coupled to said register buffers, for generating a linear address; and
    alignment confirmation logic, coupled to said second ALU, configured to receive said load length, for confirming alignment of the data entity;
    wherein said alignment check logic estimates alignment of the data entity, thereby allowing the load to proceed without a pipeline slip.

2. The microprocessor as recited in claim 1, wherein said first ALU is a 2-way ALU.

3. The microprocessor as recited in claim 1, wherein said load length corresponds to a byte length of the data entity.

4. The microprocessor as recited in claim 1, wherein said register buffers comprise:
    a base address register;
    a displacement register; and
    a segment base address register.

5. The microprocessor as recited in claim 4, wherein said partial offset is a sum of contents of said base address register and said displacement register.

6. The microprocessor as recited in claim 4, wherein said partial offset is a sum of low order bits of said base address register and said displacement register.

7. The microprocessor as recited in claim 6, wherein said sum is a 3-bit sum, for indicating an estimated index of the data entity within a first cache sub-line.

8. The microprocessor as recited in claim 7, wherein said first cache sub-line has a length of eight bytes.

9. The microprocessor as recited in claim 8, wherein said linear address is a second sum of contents of said base address register, said displacement register, and said segment base address register.

10. The microprocessor as recited in claim 9, wherein said second sum indicates a true index of the data entity within said first cache sub-line.

11. The microprocessor as recited in claim 10, wherein the data entity is aligned within the cache if it is completely stored within said first cache sub-line.

12. The microprocessor as recited in claim 11, wherein the data entity is misaligned if a first part of the data entity is stored within said first cache sub-line and a remaining part of the data entity is stored within a second cache sub-line.

13. The microprocessor as recited in claim 1, wherein said alignment check logic, upon estimation that the data entity is misaligned, generates a misaligned signal.

14. The microprocessor as recited in claim 13, wherein said misaligned signal causes retrieval of a first part of the data entity from a first cache sub-line, followed by retrieval of a remaining part of the data entity from a second cache sub-line.

15. The microprocessor as recited in claim 14, wherein said first and remaining parts of the data entity are retrieved from said first and second sub-cache lines in two pipeline cycles.

16. The microprocessor as recited in claim 15, wherein said first part of the data entity is retrieved from said first cache sub-line without said pipeline slip.

17. The microprocessor as recited in claim 1, wherein said alignment confirmation logic generates an exception signal, upon confirmation that the data entity is misaligned, and that the misalignment results from a misaligned segment base address.

18. The microprocessor as recited in claim 17, wherein said misaligned segment base address is not evenly divisible by the byte size of a first cache sub-line.

19. The microprocessor as recited in claim 18, wherein said alignment confirmation logic does not generate said exception signal, if the data entity is misaligned, and the misalignment results from said partial offset.

20. The microprocessor as recited in claim 1, wherein said second ALU is a 3-way ALU.

21. A microprocessor for executing a load of a data entity from a data cache, comprising:
    a first ALU, coupled to register buffers, for generating a partial offset during the load;
    alignment check logic, coupled to said first ALU, configured to receive a load length and said partial offset, for estimating alignment of the data entity;
        wherein said load length corresponds to a byte length of the data entity; and
        wherein the data entity is misaligned if a first part of the data entity is stored within a first cache sub-line and a remaining part of the data entity is stored within a second cache sub-line;
    a second ALU, coupled to said register buffers, for generating a linear address; and
    alignment confirmation logic, coupled to said second ALU, configured to receive said load length, for confirming alignment of the data entity;
    wherein said alignment check logic estimates the alignment of the data entity, thereby allowing the load to proceed without a pipeline slip.

22. The microprocessor as recited in claim 21, wherein said register buffers comprise:

a base address register;

a displacement register; and a segment base address register.

23. The microprocessor as recited in claim 22, wherein said partial offset is a sum of contents of said base address register and said displacement register.

24. The microprocessor as recited in claim 21, wherein said alignment check logic, upon estimation that the data entity is misaligned, generates a misaligned signal.

25. The microprocessor as recited in claim 24, wherein said misaligned signal causes retrieval of said first part of the data entity from said first cache sub-line and retrieval of said remaining part of the data entity from said second cache sub-line.

26. The microprocessor as recited in claim 25, wherein said first and remaining parts of the data entity are retrieved from said first and second sub-cache lines in two pipeline cycles.

27. The microprocessor as recited in claim 21, wherein said first part of the data entity is retrieved from said first cache sub-line without said pipeline slip.

28. The microprocessor as recited in claim 21, wherein said alignment confirmation logic generates an exception signal, upon confirmation that the data entity is misaligned, and that the misalignment results from a misaligned segment base address.

29. The microprocessor as recited in claim 28, wherein said alignment confirmation logic does not generate said exception signal, if the data entity is misaligned, and the misalignment does not result from a misaligned segment base address.

30. A microprocessor for executing a load of a data entity from a data cache, comprising:

an address sequencer, coupled to register buffers, for generating an index estimate and a true index during the load; and a load sequencer, coupled to said address sequencer, configured to receive a load length, said index estimate, and said true index, for initially estimating and later confirming alignment of the data entity;
wherein said index estimate allows said load sequencer to sequence aligned and misaligned load operations without requiring pipeline slips.

31. The microprocessor as recited in claim 30, wherein said load length corresponds to a byte length of the data entity.

32. The microprocessor as recited in claim 30, wherein said index estimate is low order bits of a partial sum of said true index.

33. The microprocessor as recited in claim 32, wherein said index estimate indicates an estimated data entity address of the data entity within a first cache sub-line.

34. The microprocessor as recited in claim 33, wherein the data entity is aligned if it is completely stored within said first cache sub-line.

35. The microprocessor as recited in claim 34, wherein the data entity is misaligned if a first part of the data entity is stored within said first cache sub-line and a remaining part of the data entity is stored within a second cache sub-line.

36. The microprocessor as recited in claim 35, wherein said load sequencer, upon estimation that the data entity is misaligned, generates a misaligned signal.

37. The microprocessor as recited in claim 36, wherein said misaligned signal causes retrieval of said first part of the data entity from said first cache sub-line and retrieval of said remaining part of the data entity from said second cache sub-line.

38. The microprocessor as recited in claim 37, wherein said load sequencer, upon confirmation that the data entity is misaligned, and that the misalignment results from a misaligned segment base address, generates an exception signal.

39. The microprocessor as recited in claim 38, wherein said misaligned segment base address is not evenly divisible by the byte size of a cache sub-line.

40. A method for loading a data entity from a cache, the method comprising:

estimating alignment of the data entity;

confirming the alignment of the data entity;

proceeding to load the data entity without a slip, whether the data entity is estimated to be aligned or misaligned; and recovering from incorrect proceeding with the load of the data entity, if said alignment estimating is incorrect.

41. The method for loading a data entity from a cache, as recited in claim 40, wherein said estimating comprises:

calculating a partial offset for the data entity; and examining a byte length for the data entity.

42. The method for loading a data entity from a cache, as recited in claim 41, wherein said calculating comprises summing low order bits of address specifiers.

43. The method for loading a data entity from a cache, as recited in claim 42, wherein said examining comprises determining from said summing and the byte length whether the data entity resides entirely within a cache sub-line.

* * * * *